(12) United States Patent
Cielinski et al.

(10) Patent No.: US 10,086,468 B2
(45) Date of Patent: Oct. 2, 2018

(54) WELD HEAD

(71) Applicant: Amada Miyachi America, Inc., Monrovia, CA (US)

(72) Inventors: David Cielinski, Long Beach, CA (US); Mark Rodighiero, Monrovia, CA (US); Matthew A. Green, Pasadena, CA (US)

(73) Assignee: AMADA MIYACHI AMERICA, INC., Monrovia, CA (US)

( * ) Notice: Subject to any disclaimer, the term of this patent is extended or adjusted under 35 U.S.C. 154(b) by 280 days.

(21) Appl. No.: 14/479,208

(22) Filed: Sep. 5, 2014

(65) Prior Publication Data

US 2015/0069026 A1    Mar. 12, 2015

Related U.S. Application Data

(60) Provisional application No. 61/874,952, filed on Sep. 6, 2013.

(51) Int. Cl.
| | |
|---|---|
| *B23K 11/31* | (2006.01) |
| *B23K 11/11* | (2006.01) |
| *H02P 29/60* | (2016.01) |

(52) U.S. Cl.
CPC .......... *B23K 11/311* (2013.01); *B23K 11/115* (2013.01); *B23K 11/315* (2013.01); *H02P 29/60* (2016.02)

(58) Field of Classification Search
CPC ....... B23K 11/11; B23K 11/25; B23K 11/115; B23K 11/24; B23K 11/311; B23K 11/315;

(Continued)

(56) References Cited

U.S. PATENT DOCUMENTS

| 4,529,115 A | 7/1985 | Renshaw et al. |
| 5,252,802 A * | 10/1993 | Raycher ................. B23K 9/205 |
| | | 219/98 |

(Continued)

FOREIGN PATENT DOCUMENTS

| EP | 1 832 372 A1 | 9/2007 | |
| JP | H11320106 | * 11/1994 | ............. B23K 11/11 |

(Continued)

OTHER PUBLICATIONS

International Search Report and Written Opinion for corresponding PCT Application No. PCT/US2014/054418, dated Dec. 17, 2014 (12 pages).

(Continued)

*Primary Examiner* — Alexander Valvis
*Assistant Examiner* — Christopher R Dandridge
(74) *Attorney, Agent, or Firm* — Lewis Roca Rothgerber Christie LLP

(57) ABSTRACT

A weld head for spot welding two or more components together. The weld head includes first and second electrode assemblies and a linear actuator motor to drive the first electrode assembly into a desired position and apply a desired clamping force. The weld head may include a sensor configured to measure a temperature of the motor and a controller configured to monitor the temperature and adjust the current supplied to the motor to maintain the desired clamping force. The weld head may include linear encoder to measure the position of the linear actuator motor and an algorithm that correlates the position of the motor with a force constant of the motor. Based on the position of the motor and the corresponding force constant of the motor, the controller is configured to adjust the current supplied to the motor to maintain the desired clamping force.

8 Claims, 5 Drawing Sheets

(58) Field of Classification Search
CPC ... B23K 11/257; B23K 11/3009; B23K 11/31; B23K 11/314; B23K 35/02; B23K 35/0261; B23K 35/40; H02P 29/60; F16H 2061/0258; F16H 61/0251
USPC .......................... 219/90, 86.32, 86.33, 86.41
See application file for complete search history.

(56) References Cited

U.S. PATENT DOCUMENTS

| | | | | |
|---|---|---|---|---|
| 5,880,424 | A * | 3/1999 | Katoh | B23K 11/115 |
| | | | | 219/86.7 |
| 5,951,610 | A | 9/1999 | Chiba et al. | |
| 6,064,028 | A * | 5/2000 | Schmid-Doernte | B23K 11/25 |
| | | | | 219/86.41 |
| 6,169,263 | B1 * | 1/2001 | Derby, Jr. | B23K 11/0073 |
| | | | | 219/101 |
| 9,073,146 | B2 * | 7/2015 | Sakai | B23K 11/255 |
| 2009/0188966 | A1 * | 7/2009 | Klinstein | B29C 65/08 |
| | | | | 228/102 |
| 2009/0266798 | A1 | 10/2009 | Yang | |
| 2011/0238083 | A1 * | 9/2011 | Moll | A61B 8/12 |
| | | | | 606/130 |

FOREIGN PATENT DOCUMENTS

| | | |
|---|---|---|
| JP | 1997-280411 A | 10/1997 |
| JP | H11-320106 A | 11/1999 |
| JP | 2008-023543 A | 2/2008 |
| JP | 2008-029174 A | 2/2008 |
| JP | 2009-274082 A | 11/2009 |

OTHER PUBLICATIONS

Japanese Office action for Application No. 2016-540445, dated Feb. 28, 2017, 9 pages (with English translation).
Extended European Search Report for Application No. 14842446.8; dated Feb. 23, 2017, 5 pages.
Chinese first Office action for Application No. 201480060934.2, dated Sep. 20, 2017, 13 pages (with English translation).
Office action for Korean Patent Application No. 10-2016-7008958, dated May 18, 2017, 11 pages.

* cited by examiner

WELD HEAD

CROSS-REFERENCE TO RELATED APPLICATION

This application claims the benefit of and priority to U.S. Provisional Application No. 61/874,952, filed Sep. 6, 2013, the entire content of which is incorporated herein by reference.

BACKGROUND

Weld heads are commonly used to spot weld two or more metal components, such as two overlapping sheet metal components, together. Weld heads commonly include a pair of opposing electrodes configured to both supply pressure to clamp the components together and supply current through the components. Weld heads may alternatively include a pair of side-by-side electrodes configured to supply current through the components. As current is passed through the electrodes, the electrical resistance supplied by the components tends to locally heat the components around the points of contact of the electrodes or at the mating surface of the components, thereby locally melting the metal components together to form a spot weld.

Additionally, conventional weld heads are configured to support a variety of different configurations of electrodes. Different configurations of electrodes may be selected based upon the desired size of the spot weld and the configuration of the metal components to be welded. However, removing and replacing the electrodes on conventional weld heads may be cumbersome and time-consuming. Additionally, it may be difficult to properly align the electrodes on conventional weld heads because the electrodes must be installed in situ. Moreover, some conventional weld heads are susceptible to temperature variations that may adversely affect the force output of the electrodes and thereby the quality of the resultant spot welds. Furthermore, conventional weld heads incorporate a linear actuator motor to adjust the position of the electrodes. Such conventional weld heads are susceptible to variations in clamping force depending on the position of the linear actuator motor because the strength of the magnets in the linear actuator motor varies along the stroke of the motor. Additionally, when the power supply is cutoff from conventional weld heads, the electrodes tend to strike each other, which may damage or prematurely wear the electrodes.

SUMMARY

The present disclosure is directed to a weld head configured to spot weld two or more components together. In one embodiment, the weld head includes first and second electrode assemblies configured to supply a weld current through the components. The weld head also includes a linear actuator motor configured to drive the first electrode assembly into a desired position and to apply a desired clamping force to the components. In one embodiment, the weld head includes an actuator arm coupling the linear actuator motor to the upper electrode assembly. The weld head further includes a temperature sensor coupled to the linear actuator motor and configured to measure a temperature of magnets housed in the linear actuator motor. The weld head also includes a controller configured to monitor the temperature measured by the temperature sensor. Based upon the measured temperature, the controller is configured to adjust the current/voltage supplied to the linear actuator motor to maintain the desired clamping force. In one embodiment, the temperature sensor is a thermistor. In one embodiment, the first electrode assembly includes an upper adapter and a lower adapter detachably coupled to the upper adapter. The lower adapter is configured to detachably receive an electrode. In one embodiment, the weld head also includes a brake configured to move between an engaged position and a disengaged position. In the engaged position, the first electrode assembly is locked. In the disengaged position, the linear actuator motor is free to drive the position of the first electrode assembly. In one embodiment, the brake is configured to move into the disengaged position when power is supplied to the brake and the brake is configured to move into the engaged position when the power is cutoff from the brake or when a user initiates an input command to the controller to apply the brake. In one embodiment, the brake includes a spring-loaded brake configured to engage and disengage a plurality of grooves in the actuator arm and a solenoid configured to drive the spring-loaded brake.

The present disclosure is also directed to a weld head including first and second electrode assemblies configured to supply a weld current through the components. The weld head also includes a linear actuator motor housing a series of magnets. The linear actuator motor is configured to drive the first electrode assembly into a desired position and to apply a desired clamping force to the components. The weld head also includes a linear encoder coupled to the linear actuator motor. The linear encoder is configured to measure a position of the linear actuator motor. The weld head also includes a controller configured to monitor the position of the linear actuator motor measured by the linear encoder. The weld head also includes an algorithm programmed on the controller that correlates the position of the linear actuator motor with a force constant of the linear actuator motor. Based upon the position of the linear actuator motor and the corresponding force constant of the linear actuator motor, the controller is configured to adjust the current supplied to the linear actuator motor to maintain the desired clamping force. In one embodiment, the algorithm is a pre-calculated lookup table. In one embodiment, the linear encoder includes an optical sensor. In one embodiment, the first electrode assembly includes an upper adapter and a lower adapter detachably coupled to the upper adapter, wherein the lower adapter is configured to detachably receive an electrode. In one embodiment, the weld head also includes a brake configured to move between an engaged position in which the position of the first electrode assembly is locked and a disengaged position in which the linear actuator motor is free to drive the position of the first electrode assembly.

The present disclosure is also directed to a weld head including first and second electrode assemblies configured to supply a weld current through the components, a linear actuator motor configured to drive the first electrode assembly into a desired position and to apply a desired clamping force to the components, an actuator arm coupling the linear actuator motor to the first electrode assembly, and a brake assembly configured to move between an engaged position in which the position of the first electrode assembly is locked and a disengaged position in which the linear actuator motor is free to drive the position of the first electrode assembly. In one embodiment, the brake assembly is configured to move into the disengaged position when power is supplied to the linear actuator motor and to move into the engaged position when the power is cutoff from the linear actuator motor. In one embodiment, the brake is configured to move into the engaged position when a user initiates a command to a controller. In one embodiment, the brake assembly includes a brake having a plurality of teeth configured to engage and disengage a plurality of grooves in the actuator arm, a linear solenoid configured to drive the brake into the disengaged position, and a spring configured to bias the brake into the engaged position. In one embodiment, the weld head also includes a shaft assembly having a first end coupled to the brake and a second end coupled to the linear solenoid.

This summary is provided to introduce a selection of concepts that are further described below in the detailed description. This summary is not intended to identify key or essential features of the claimed subject matter, nor is it intended to be used in limiting the scope of the claimed subject matter.

BRIEF DESCRIPTION OF THE DRAWINGS

Embodiments of a weld head according to the present disclosure are described with reference to the following figures. The same reference numerals are used throughout the figures to reference like features and components. The figures are not necessarily drawn to scale.

DETAILED DESCRIPTION

The present disclosure is directed to various embodiments of a weld head configured to spot weld two or more components together by supplying current through a pair of opposing electrodes pressed against opposite sides of the components or a pair of side-by-side electrodes pressed against a surface of one or more of the components. Additionally, embodiments of the weld head of the present disclosure are configured to compensate for operating temperature variation or fluctuation within a linear actuator motor configured to drive the position of one or both of the electrodes. Furthermore, embodiments of the weld head are configured to compensate for magnetic strength variations in magnets housed in the linear actuator motor. Embodiments of the weld head of the present disclosure also include a brake configured to lock the position of the electrodes when power is cutoff from the weld head, thereby preventing the electrodes from striking each other, which might otherwise damage or prematurely wear down the electrodes.

Figure 1:
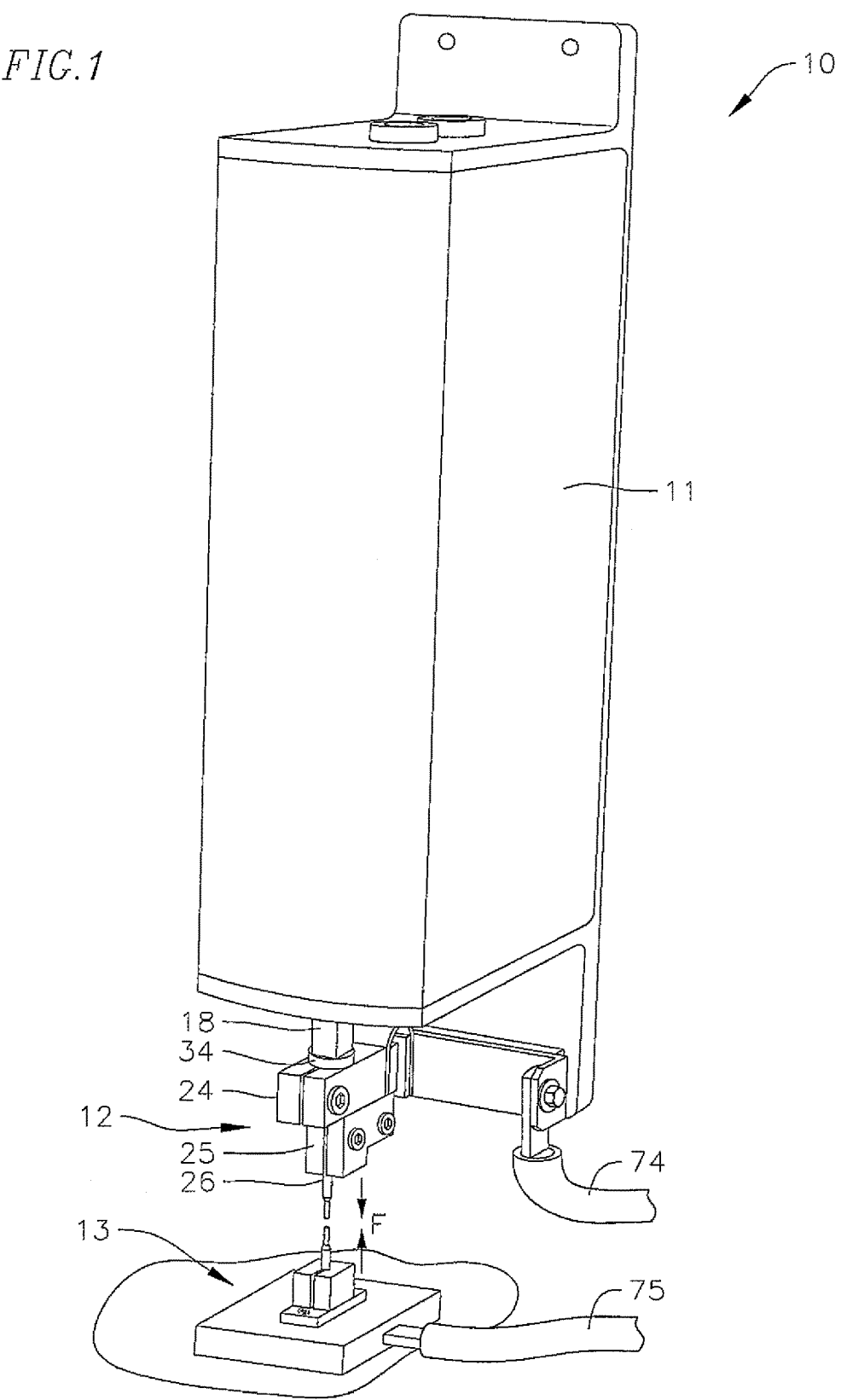
FIG. 1 is a perspective view of a weld head including a housing and a pair of upper and lower electrode assemblies according to one embodiment of the present disclosure.
Figure 2:
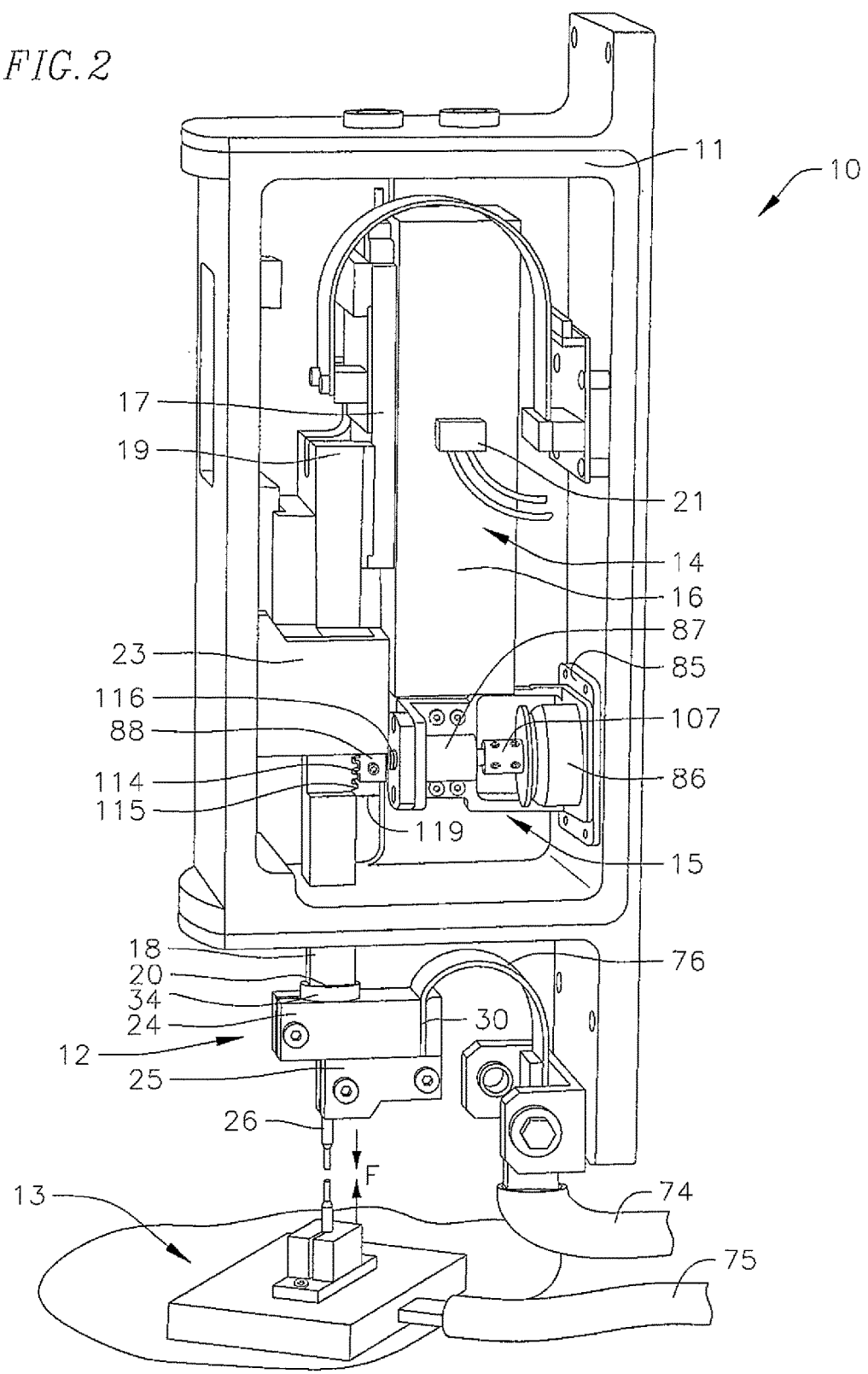
FIG. 2 is a perspective view of the weld head of FIG. 1, with a portion of the housing omitted to reveal a linear actuator motor and a brake housed in the housing.

With reference now to the embodiment illustrated in FIG. 1, the weld head 10 includes a housing 11 configured to house a variety of components and upper and lower electrode assemblies 12, 13, respectively, disposed outside of the housing 11. As illustrated in FIG. 2, the housing 11 houses a permanent-magnet linear actuator motor 14 configured to drive the position of the upper electrode assembly 12 and a brake assembly 15 configured to lock the position of the upper electrode assembly 12 when power is cutoff from the weld head 10. The linear actuator motor 14 is configured to space the upper electrode assembly 12 apart from the lower electrode assembly 13 such that components having a variety of different sizes and shapes can be inserted between the upper and lower electrode assemblies 12, 13 and thereby spot welded together. The linear actuator motor 14 is also configured to drive the position of the upper electrode assembly 12 to supply a desired clamping force F holding the components together during the welding operation.

In one embodiment, the permanent-magnet linear actuator motor 14 includes a U-shaped magnet track 16 supporting a first and second set of magnets. The first and second sets of magnets face each other and are spaced apart by a gap. The magnets in each of the first and second sets are arranged with alternating magnetic polarities. The U-shaped magnet track 16 may be configured to support any desired number of magnets, such as, for instance, twenty or more magnets. Additionally, the linear actuator motor 14 includes a stator or forcer 17 having a plurality of windings or coils. The forcer 17 is disposed in the gap between the first and second sets of magnets and is configured to slide up and down along the magnet track 16 by a maximum predetermined distance (i.e., a stroke of the linear actuator motor). The linear actuator motor 14 may have any desired stroke, such as, for instance, approximately 1 inch, depending upon the shape and size of the components the weld head 10 is configured to accommodate. The forcer 17 may be supported along the U-shaped magnet track 16 by any suitable means, such as, for instance, a bearing or rail system. Although in one embodiment the linear actuator motor 14 is a U-channel linear motor, in one or more alternate embodiments, the weld head 10 may include any other suitable type of linear actuator motor, such as, for instance, a cylindrical moving-magnet type linear motor or a flat-type linear motor.

The weld head 10 also includes an actuator arm 18 protruding out of the housing 11. An upper end 19 of the actuator arm 18 is coupled to the forcer 17 and a lower end 20 of the actuator arm 18 is coupled to the upper electrode assembly 12. Accordingly, the linear actuator motor 14 is configured to drive the position of the actuator arm 18 and thereby drive the position of the upper electrode assembly 12 based upon the shape and size of the components to be welded and the desired clamping force F (i.e., the linear actuator motor 14 is configured to move the actuator arm 18 and the upper electrode assembly 12 up and down).

With continued reference to FIG. 2, the weld head 10 also includes a temperature sensor 21, such as, for instance, a thermistor or a thermocouple, coupled to the linear actuator motor 14 and configured to measure the temperature of the magnets housed in the linear actuator motor 14. The temperature of the magnets in the linear actuator motor 14 affects the clamping force output F of the linear actuator motor 14 (i.e., the clamping force F supplied by the linear actuator motor 14 is a function of the temperature of the magnets in the linear actuator motor 14). In general, the higher the temperature of the magnets in the linear actuator motor 14, the lower the clamping force output F of the linear actuator motor 14. The weld head 10 also includes a controller configured to monitor the temperature measured by the temperature sensor 21 and, based upon the temperature of the magnets in the linear actuator motor 14, adjust the current supplied to the linear actuator motor 14 in order to maintain the desired clamping force output F of the linear actuator motor 14 (i.e., the controller is configured to compensate for temperature variations and fluctuations of the magnets in the linear actuator motor 14 by adjusting the current supplied to the linear actuator motor 14).

With continued reference to FIG. 2, the weld head 10 also includes a linear encoder 23 housed in the housing 11. The linear encoder 23 includes a sensor and a scale. The sensor is configured to measure the position of the forcer 17 relative to the scale. The linear encoder 23 may include any suitable type of sensor, such as, for instance, an optical sensor, a magnetic sensor, or an eddy current sensor. Additionally, the controller is configured to compensate for variations in the magnetic field strength of the magnets in the linear actuator motor 14 as a function of the position of the forcer 17 along its stroke. Minor variations in the strength of the magnets in the linear actuator motor 14 affect the clamping force output F of the linear actuator motor 14. In general, relatively higher strength magnets produce greater clamping forces F than relatively lower strength magnets. In one embodiment, the controller is programmed with an algorithm (e.g., a pre-calculated lookup table) which correlates the force constant of the linear actuator motor 14 with the position of the forcer 17 along its stroke. The lookup table may be generated by measuring the output force of the forcer 17 at a series of discrete positions of the forcer 17 along its stroke. Linear interpolation may be performed to determine the force constant of the linear actuator motor 14 for positions of the forcer 17 that were not directly measured. Accordingly, the controller is configured to both monitor the position of the forcer 17 measured by the linear encoder 23 and to reference the algorithm (e.g., the pre-calculated lookup table) programmed on the controller to determine the force constant of the linear actuator motor 14 at the current position of the forcer 17. Based upon the position of the forcer 17 and the corresponding force constant of the linear actuator motor 14 at that position, which is determined by referencing the algorithm (e.g., the pre-calculated lookup table) programmed on the controller, the controller is configured to adjust the current supplied to the linear actuator motor 14 to maintain the desired clamping force F of the linear actuator motor 14 (i.e., the controller is configured to compensate for variations in the magnetic field strength of the magnets in the linear actuator motor 14 by adjusting the current supplied to the linear actuator motor 14 to maintain a consistent, desired clamping force F of the weld head 10). Otherwise, the clamping force output F of the linear actuator motor 14 would vary along the stroke of the linear actuator motor 14.

Figure 3:
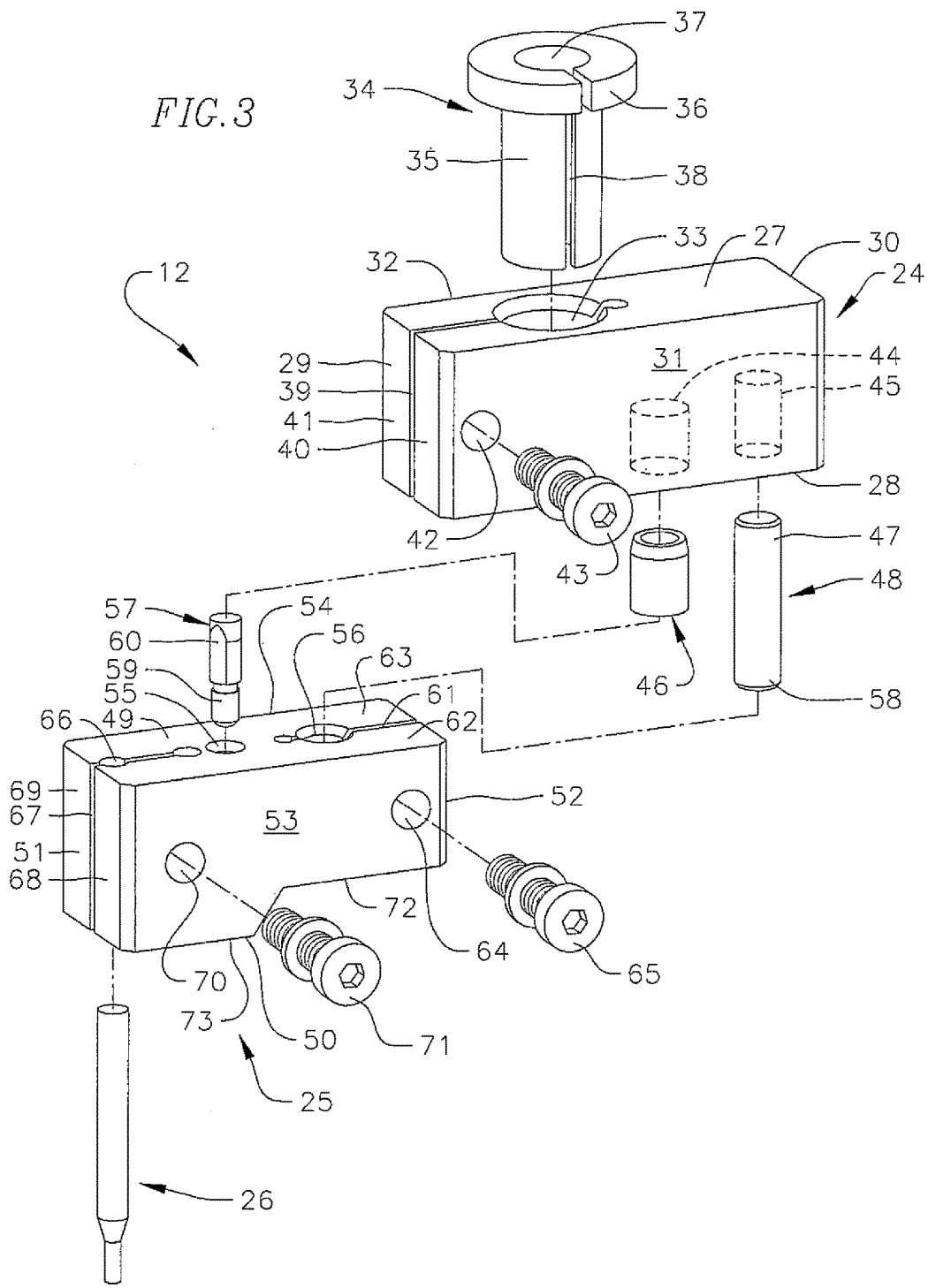
FIG. 3 is an exploded perspective view of the upper electrode assembly of FIG. 1.

With reference now to FIG. 3, the upper electrode assembly 12 includes an upper mounting block or adapter 24 and a lower mounting block or adapter 25 detachably connected to the upper adapter 24. The lower adapter 25 is configured to receive and support a variety of electrodes 26 having different configurations depending on the configuration of the components to be spot welded together. For instance, the lower adapter 25 may be configured to receive an electrode 26 having a pointed, flat, domed, and/or offset electrode tip. In normal operation, the upper adapter 24 is configured to remain attached to the lower end 20 of the actuator arm 18 (see FIG. 2) and the lower adapter 25 is configured to be detached from the upper adapter 24. Detaching the lower adapter 25 from the upper adapter 24 facilitates removal and replacement of the electrode 26 in a controlled environment, such as a workbench. Otherwise, removing and replacing the electrode 26 in situ (i.e., without removing the lower adapter 25) may be cumbersome and may result in misalignment between the electrode 26 and the lower adapter 25, which may produce poor spot weld quality and may cause premature wear of the electrode 26. Once the desired electrode 26 has been installed on the lower adapter 25, the lower adapter 25 may be readily reattached to the upper adapter 24.

In the illustrated embodiment of FIG. 3, the upper adapter 24 is a rectangular block having a pair of longer sides 27, 28 extending in a longitudinal direction and a pair of shorter sides 29, 30 extending in a direction transverse to the longer sides 27, 28. The upper adapter 24 also includes an inner face 31 and an outer face 32 opposite the inner face 31. In one or more alternate embodiments, the upper adapter 24 may have any other suitable shape, such as, for instance, a square block. The upper adapter 24 also includes an opening 33, such as a smooth bore, extending between the longer sides 27, 28. The opening 33 is configured to receive a sleeve 34 configured to electrically isolate the upper adapter 24 from the actuator arm 18 (see FIG. 2). The sleeve 34 may be composed of any material suitable to electrically isolate the upper electrode assembly 12 from the actuator arm 18, such as, for instance, plastic, hard anodized aluminum, or ceramic. In the illustrated embodiment, the sleeve 34 includes a cylindrical shank 35 and an annular head 36 on an upper end of the shank 35. The sleeve 34 also defines a central opening 37 and a narrow slit 38 extending along the length of the central opening 37. The cylindrical shank 35 on the sleeve 34 is configured to be received in the opening 33 in the upper adapter 24 and the annular head 36 on the sleeve 34 is configured to be seated on the longer side 27 of the upper adapter 24. The central opening 37 in the sleeve 34 is configured to receive a protrusion (not shown) on the lower end 20 of the actuator arm 18 to couple the upper adapter 24 to the actuator arm 18.

As illustrated in FIG. 3, the upper adapter 24 also includes a narrow slit 39 extending between the opening 33 and the shorter side 30. The narrow slit 39 defines a pair of opposing legs 40, 41. The legs 40, 41 are configured to move between an uncompressed position in which the legs 40, 41 are spaced apart from each other and a compressed position in which the legs 40, 41 abut each other. As the legs 40, 41 are moved between the uncompressed and compressed positions and between the compressed and uncompressed positions, the opening 33 in the upper adapter 24 is configured to circumferentially contract and expand, respectively, about the cylindrical shank 35 of the sleeve 34. The upper adapter 24 also includes an opening 42 extending through the legs 40, 41. The opening 42 is configured to receive a fastener 43, such as, for instance, a socket head screw. Tightening the fastener 43 is configured to draw the legs 40, 41 together and thereby circumferentially contract the opening 33 around the sleeve 34. As the opening 33 in the upper adapter 24 circumferentially contracts around the sleeve 34, the sleeve 34 is configured to circumferentially contract around the protrusion on the lower end 20 of the actuator arm 18 to couple the upper adapter 24 to the lower end 20 of the actuator arm 18. In contrast, loosening the fastener 43 is configured to draw the legs 40, 41 apart and thereby circumferentially expand the opening 33 around the sleeve 34, thereby permitting the upper adapter 24 to be detached from the sleeve 34 and the lower end 20 of the actuator arm 18. Detaching the upper adapter 24 from the actuator 18 facilitates replacement or maintenance of the upper electrode assembly 12.

With continued reference to FIG. 3, the upper adapter 24 also includes a pair of smooth, blind bores 44, 45 extending upward from the lower longer side 28. One of the smooth, blind bores 44 is configured to receive a thin-walled cylindrical bushing 46 and the other smooth bore 45 is configured to receive an upper end 47 of a cylindrical dowel pin 48, the significance of both of which are described below. The thin-walled bushing 46 and the dowel pin 48 may be received in the blind bores 44, 45, respectively, by any suitable means, such as, for instance, threading, bonding, or with a press fit (i.e., friction fit) connection.

In the illustrated embodiment of FIG. 3, the lower adapter 25 is a block having a pair of longer sides 49, 50 extending in a longitudinal direction and a pair of shorter sides 51, 52 extending in a direction transverse to the longer sides 49, 50. The lower adapter 25 also includes an inner face 53 and an outer face 54 opposite the inner face 53. In one or more alternate embodiments, the lower adapter 25 may have any other suitable shape, such as, for instance, a square block. The lower adapter 25 also includes a pair of openings 55, 56 extending downward from the upper longer side 49. In the illustrated embodiment, one of the openings 55 is a smooth, blind bore and the other opening 56 is a through hole extending between the longer sides 49, 50 of the lower adapter 25. One of the openings 55 is configured to receive a locating pin 57 and the other opening 56 is configured to receive a lower end 58 of the dowel pin 48. In the illustrated embodiment, the locating pin 57 includes a cylindrical shank 59 and a diamond-shaped head 60. The cylindrical shank 59 is configured to be received in the opening 55 in the lower adapter 25 and the diamond-shaped head 60 is configured to be received in the thin-walled bushing 46 in the upper adapter 24. In one embodiment, the cylindrical shank 59 is press fit into the opening 55 in the lower adapter 25 and the diamond-shaped head 60 is loose fit or light interference fit into the bushing 46 in the upper adapter 24. Together, the locating pin 57 and the dowel pin 48 are configured to ensure proper alignment between the upper and lower adapters 24, 25 when they are coupled together. As described in detail below, the dowel pin 48 is also configured to transmit electrode current from the upper adapter 24 to the electrode 26 supported by the lower adapter 25.

Still referring to FIG. 3, the lower adapter 25 also includes a narrow slit 61 extending between the opening 56 and the shorter side 52. The narrow slit 61 defines a pair of legs 62, 63 that is configured to move between an uncompressed position in which the legs 62, 63 are spaced apart from each other and a compressed position in which the legs 62, 63 abut each other. As the legs 62, 63 are moved between the uncompressed and compressed positions and between the compressed and uncompressed positions, the opening 56 is configured to circumferentially contract and expand, respectively, about the lower end 58 of the dowel pin 48. The lower adapter 25 also includes an opening 64, such as a through hole, extending through the legs 62, 63. The opening 64 is configured to receive a fastener 65, such as, for instance, a socket head screw. Tightening the fastener 65 is configured to draw the legs 62, 63 together and thereby circumferentially contract the opening 56 around the lower end 58 of the dowel pin 48. In the circumferentially contracted position, the lower adapter 25 is detachably coupled to the dowel pin 48 and the upper adapter 24. In contrast, loosening the fastener 65 is configured to draw the legs 62, 63 apart and circumferentially expand the opening 56, thereby permitting the lower adapter 25 to be detached from the upper adapter 24 by sliding the lower adapter 25 downward until the dowel pin 48 is drawn out of the opening 56. Detaching the lower adapter 25 from the upper adapter 24 enables a user to remove and replace the electrode 26 supported by the lower adapter 25 in a controlled environment, such as workbench, which permits the user to readily ensure that the electrode 26 is properly aligned with the lower adapter 25.

The lower adapter 25 also includes an opening 66, such as, for instance, a through hole, extending between the longer sides 49, 50. The opening 66 is configured to selectively receive the electrode 26 having a desired configuration based upon the configuration of the components to be welded and the desired size of the spot weld. Additionally, the lower adapter 25 includes a narrow slit 67 extending between the shorter side 51 of the lower adapter 25 and the opening 66. The narrow slit 67 defines a pair of legs 68, 69 that is configured to move between an uncompressed position in which the legs 68, 69 are spaced apart from each other and a compressed position in which the legs 68, 69 abut each other. As the legs 68, 69 are moved between the uncompressed and compressed positions and between the compressed and uncompressed positions, the opening 66 is configured to circumferentially contract and expand, respectively, about the electrode 26 to permit the electrode 26 to be installed and removed, respectively. The lower adapter 25 also includes an opening 70, such as a through hole, extending through the legs 68, 69. The opening 70 is configured to receive a fastener 71, such as, for instance, a socket head screw. Tightening the fastener 71 is configured to draw the legs 68, 69 together and thereby circumferentially contract the opening 66 around the electrode 26 to secure the electrode 26 to the lower adapter 25. In contrast, loosening the fastener 71 is configured to draw the legs 68, 69 apart and circumferentially expand the opening 66, thereby permitting the electrode 26 to be detached from the lower adapter 25 by sliding the electrode 26 out of the opening 66. Additionally, in the illustrated embodiment, the lower adapter 25 includes a notch 72 in the longer side 50 that defines a raised or protruding portion 73 through which the electrode 26 extends. The notch 72 and the protruding portion 73 are configured to facilitate spot welding of components having various shapes and configurations. In one or more alternate embodiments, the lower adapter 25 may be provided without the notch 72 and the protruding portion 73.

Although only the upper electrode assembly 12 has been described in detail above, it will be appreciated that the lower electrode assembly 13 may have the same or similar configuration as the upper electrode assembly 12, and therefore the lower electrode assembly 12 is not described in order to avoid duplication.

With reference now to the embodiment illustrated in FIGS. 2 and 3, the weld head 10 includes an input cable 74 electrically coupled to the upper electrode assembly 12 and an output cable 75 electrically coupled to the lower electrode assembly 13. Together, the cables 74, 75 are configured to supply weld current to the electrodes 26 in the upper and lower electrode assemblies 12, 13. The weld head 10 also includes a strap 76 electrically coupling the input cable 74 to the upper adapter 24. In the illustrated embodiment, the strap 76 is coupled to the shorter side 30 of the upper adapter 24. The weld current may be any suitable current depending upon the size and thickness of the components to be welded and the desired size of the spot weld, such as, for instance, approximately 5 Amps to approximately 4,000 Amps. The dowel pin 48 is configured to transmit the weld current from the upper adapter 24 to the lower adapter 25 and then to the electrode 26. The dowel pin 48 may be composed of any electrically conductive material, such as, for instance, aluminum. Additionally, as described above, the sleeve 34 is configured to electrically isolate the upper adapter 24 from the actuator arm 18 such that the weld current does not flow into the actuator arm 18. Accordingly, the weld current flows from the electrode 26 in the upper electrode assembly 12, through the components to be welded, and then to the electrode 26 in the lower electrode assembly 13. As current passes through the components, the electrical resistance supplied by the components tends to locally heat the components around the points of contact of the electrodes 26, thereby locally melting the metal components to form a spot weld joining the components together.

With reference now to the embodiment illustrated in FIGS. 4A and 4B, the brake assembly 15 will be described in detail. The brake assembly 15 is configured to prevent the upper electrode assembly 12 from striking the lower electrode assembly 13 when power is cutoff from the linear actuator motor 14, such as following completion of a spot welding operation. The brake assembly 15 may also be actuated by a user initiating a command to a controller. Otherwise, contact between the upper and lower electrode assemblies 12, 13 may damage or prematurely wear the electrodes 26 (i.e., in the absence of the brake assembly 15, the upper electrode assembly 12 would fall downward and strike the lower electrode assembly 13 when power is cutoff from the linear actuator motor 14 because the linear actuator motor 14 and the electrode assemblies 12, 13 are oriented vertically). In the illustrated embodiment, the brake assembly 15 includes a mounting bracket 85 configured to mount the brake assembly 15 to the interior of the housing 11, as illustrated in FIG. 2. The brake assembly 15 also includes a linear solenoid 86 and a shaft assembly 87, both of which are coupled to the mounting bracket 85. The brake assembly 15 further includes a spring-loaded brake 88. As described in more detail below, the spring-loaded brake 88 is configured to move between a disengaged position when power is supplied to the weld head 10 during a spot welding operation and an engaged position when power is cutoff from the weld head 10 following completion of the spot welding operation. In the disengaged position, the linear actuator motor 14 is free to drive the position of the upper electrode assembly 12 during the spot welding operation. In the engaged position, the brake assembly 15 is configured to lock the position of the upper electrode assembly 12 and prevent it from striking the lower electrode assembly 13.

Figure 4A:
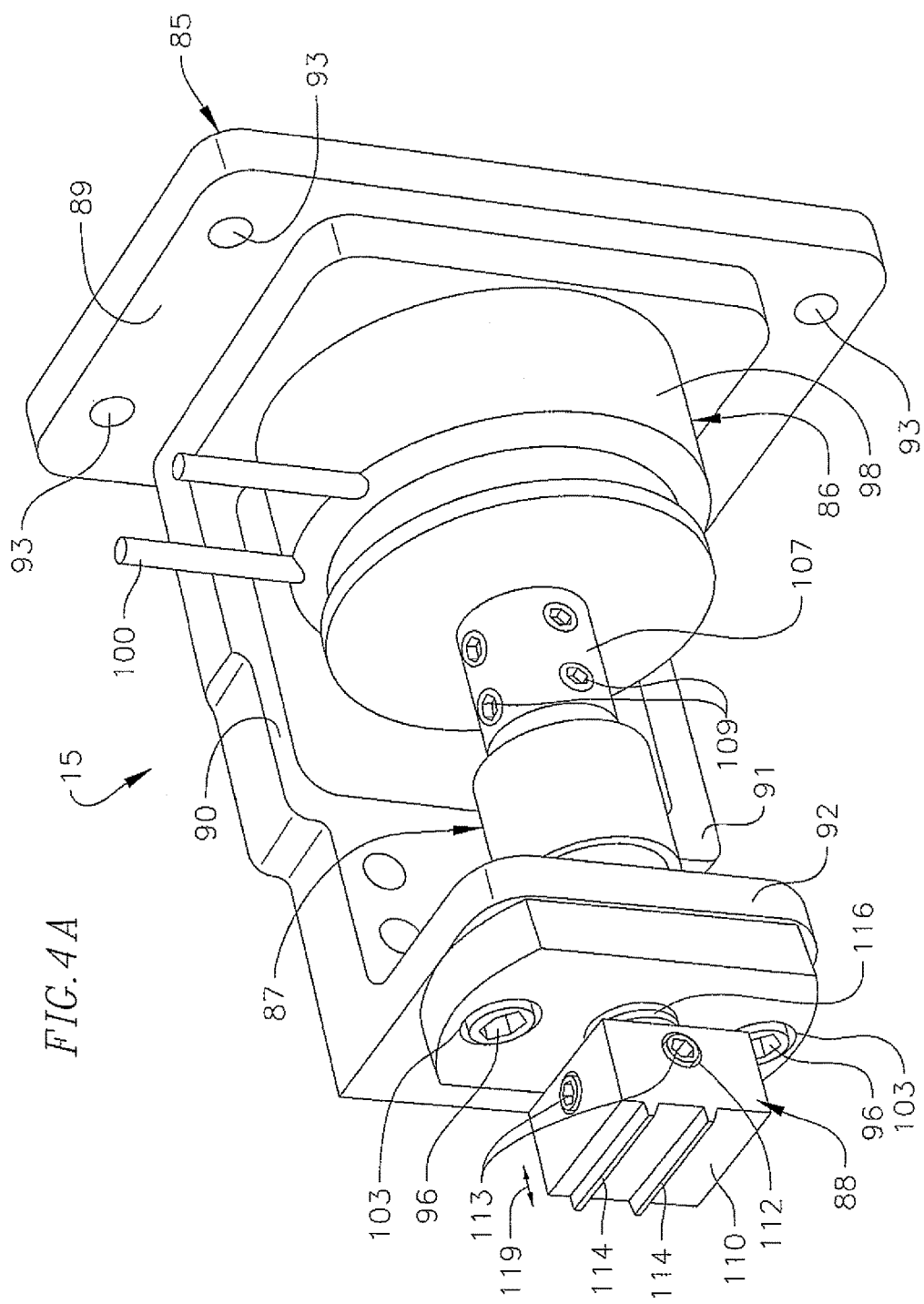
FIGS. 4A and 4B are a perspective view and an exploded perspective view, respectively, of the brake of FIG. 2.
Figure 4B:
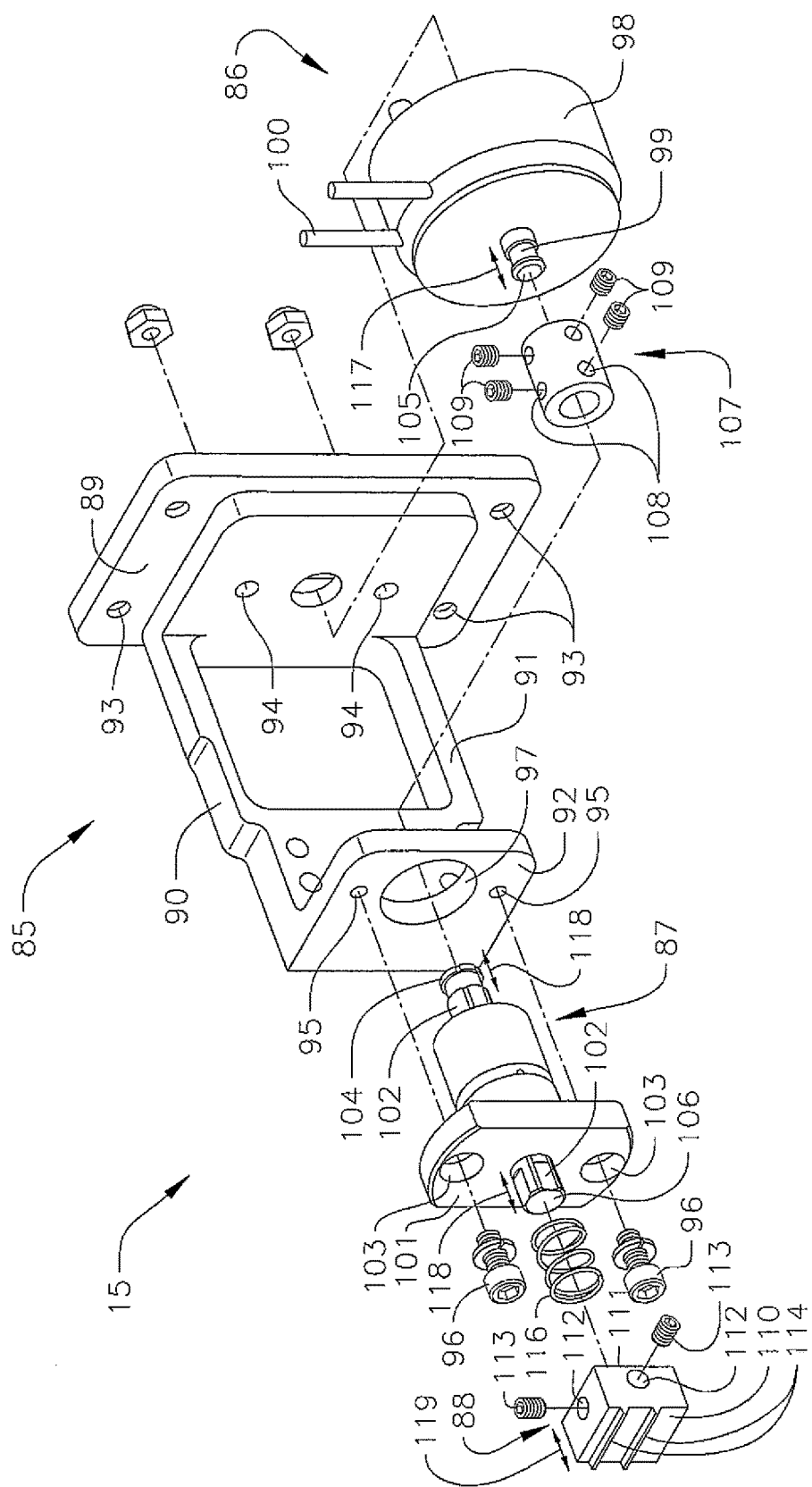

In the embodiment illustrated in FIGS. 4A and 4B, the mounting bracket 85 includes a base plate 89, a pair of support arms 90, 91 projecting from the base plate 89, and a flange 92 extending from outer ends of the support arms 90, 91 such that the flange 92 is spaced apart from the base plate 89. In the illustrated embodiment, the flange 92 is substantially parallel to the base plate 89. Together, the base plate 89, the support arms 90, 91, and the flange 92 define a generally U-shaped mounting bracket 85. The base plate 89 includes a plurality of openings 93, such as, for instance, four openings, configured to receive fasteners securing the mounting bracket 85 to the housing 11 of the weld head 10, as illustrated in FIG. 2. The base plate 89 of the mounting bracket 85 also includes a pair of openings 94 configured to receive fasteners securing the linear solenoid 86 to the mounting bracket 85. Similarly, the flange 92 of the mounting bracket 85 includes a plurality of openings 95, such as, for instance, two openings, configured to receive fasteners 96 securing the shaft assembly 87 to the mounting bracket 85. The flange 92 also includes an opening 97 configured to receive a portion of the shaft assembly 87, as described in more detail below.

With continued reference to FIGS. 4A and 4B, the linear solenoid 86 includes a cylindrical case 98 housing a plunger 99 and a coil 100 wound around the plunger 99. The plunger 99 is configured to slide (arrow 117) between an extended position and a retracted position. When current is supplied to the coil 100, an electromagnetic field is generated that tends to slide the plunger 99 into the retracted position in the cylindrical case 98. When current is cutoff from the linear solenoid 86, the plunger 99 is configured to return to the extended position protruding outward from the cylindrical case 98.

Still referring to FIGS. 4A and 4B, the shaft assembly 87 includes a mounting plate 101 and a shaft 102 configured to slide (arrow 118) between an extended position and a retracted position. The mounting plate 101 includes a pair of openings 103 to receive the fasteners 96 securing the shaft assembly 87 to the flange 92 of the mounting bracket 85. When the shaft assembly 87 is coupled to the mounting bracket 85, the shaft 102 extends through the opening 97 in the flange 92. The shaft 102 includes an inner end 104 configured to be coupled to an outer end 105 of the plunger 99 on the linear solenoid 86 and an outer end 106 opposite the inner end 104 configured to be coupled to spring-loaded brake 88. The inner end 104 of the shaft 102 may be coupled to the outer end 105 of the plunger 99 by any suitable means. In the illustrated embodiment, a collar 107 is configured to couple the shaft 102 to the plunger 99. The collar 107 is a thin-walled cylindrical tube configured to slide over the inner and outer ends 104, 105 of the shaft and the plunger 102, 99, respectively. The collar 107 also includes a plurality of radial openings 108 configured to receive fasteners 109, such as set screws, securing the collar 107 to both the plunger 99 and the shaft 102.

As illustrated in FIGS. 4A and 4B, the brake 88 is a rectangular block having an outer face 110 and an inner face 111 opposite the outer face 110. The brake 88 includes a plurality of openings 112, such as, for instance, two openings, configured to receive fasteners 113, such as set screws, coupling the brake 88 to the outer end 106 of the shaft 102. The outer face 110 of the brake 88 includes a plurality of ridges or teeth 114. Although in the illustrated embodiment the brake 88 includes two teeth 114, in one or more alternate embodiments the brake 88 may have any other suitable number of teeth 114, such as, for instance, from one to ten teeth 114. As described below, the teeth 114 on the brake 88 are configured to engage corresponding grooves 115 on the actuator arm 18, as illustrated in FIG. 2, and thereby prevent the electrode 26 on the upper electrode assembly 12 from striking the electrode on the lower electrode assembly 13 when power is cutoff from the linear actuator motor 14. The brake assembly 15 also includes a spring 116 disposed between the inner face 111 of the brake 88 and the mounting plate 101 on the shaft assembly 87, the significance of which is explained below.

In operation, the brake 88 is configured to move (arrow 119) between an engaged position and a disengaged position. When current is supplied to the linear solenoid 86, the plunger 99 is configured to move (arrow 117) into the retracted position. Moreover, because the plunger 99 is coupled to the shaft 102 via the collar 107, the retraction of the plunger 99 is configured to pull the shaft 102 into the retracted position (i.e., the shaft 102 slides (arrow 118) into the retracted position). Additionally, the retraction of the plunger 99 is configured to supply sufficient force to overcome the biasing force of the spring 116 such that the brake 88 slides (arrow 119) into the disengaged position and compresses the spring 116 (i.e., the retraction of the plunger 99 and the shaft 102 are configured to drive the brake 88 into the disengaged position). In the disengaged position, the teeth 114 on the brake 88 are disengaged from the corresponding grooves 115 in the actuator arm 18 (see FIG. 2) such that the linear actuator motor 14 is free to drive the actuator arm 18 and the upper electrode assembly 12 into the desired position. Accordingly, the brake 88 is in the disengaged position during a spot welding operation.

When power is cutoff from the linear solenoid 86, such as following completion of a spot welding operation, the electromagnetic force pulling the plunger 99 and the shaft 102 into their retracted positions is eliminated and therefore the biasing force of the spring 116 is configured to return the brake 88 to the engaged position (i.e., when power is cutoff to the linear solenoid 86, the spring 116 is configured to bias the brake 88 into the engaged position). In the engaged position, the engagement between the teeth 114 on the brake 88 and the grooves 115 in the actuator arm 18 is configured to lock the position of the actuator arm 18 and the upper electrode assembly 12, thereby preventing the upper electrode assembly 12 from falling and striking the lower electrode assembly 13, as illustrated in FIG. 2. Additionally, the spring 116 is configured to return the shaft 102 and the plunger 99 to their initial extended positions (i.e., when power is cutoff to the linear solenoid 86, the biasing force supplied by the compressed spring 116 forces the plunger 99 and the shaft 102 to slide 117, 118, respectively, back into their extended positions). Accordingly, the shaft 102 and the plunger 99 may be subsequently driven back into their retracted positions to disengage the brake 88 by supplying power to the linear solenoid 86 such that the linear actuator motor 14 may freely drive the position of the upper electrode assembly 12 during a subsequent spot welding operation.

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims. Although relative terms such as "outer," "inner," "upper," "lower," "below," and "above," and similar terms have been used herein to describe a spatial relationship of one element to another, it is understood that these terms are intended to encompass different orientations of the various elements and components of the device in addition to the orientation depicted in the figures. Additionally, as used herein, the terms "substantially," "generally," and similar terms are used as terms of approximation and not as terms of degree, and are intended to account for the inherent deviations in measured or calculated values that would be recognized by those of ordinary skill in the art.

What is claimed is:

1. A weld head configured to spot weld two or more components together, the weld head comprising:
    first and second electrode assemblies configured to supply a weld current through the components;
    a linear actuator motor housing a plurality of magnets, each magnet of the plurality of magnets having a magnetic field strength, wherein the linear actuator motor is configured to drive the first electrode assembly into a desired position and to apply a desired clamping force to the components;
    a linear encoder coupled to the linear actuator motor and configured to measure a current position of the linear actuator motor;
    a controller configured to monitor the current position of the linear actuator motor measured by the linear encoder;
    an algorithm programmed on the controller, the algorithm correlating the current position of the linear actuator motor with a force constant of the linear actuator motor at the current position, the force constant being a function of the magnetic field strength of one or more magnets of the plurality of magnets at the current position, wherein
        the controller, based upon the current position of the linear actuator motor and the corresponding force constant of the linear actuator motor at the current position, is configured to adjust the current supplied to the linear actuator motor to compensate for variations in the magnet field strength of the magnets along a stroke of the linear actuator motor and to maintain the desired clamping force.

2. The weld head of claim 1, wherein the algorithm is a pre-calculated lookup table.

3. The weld head of claim 1, wherein the linear encoder comprises an optical sensor.

4. The weld head of claim 1, wherein the first electrode assembly comprises:
    an upper adapter; and
    a lower adapter detachably coupled to the upper adapter, wherein the lower adapter is configured to detachably receive an electrode.

5. The weld head of claim 1, further comprising a brake configured to move between an engaged position in which the position of the first electrode assembly is locked and a disengaged position in which the linear actuator motor is free to drive the position of the first electrode assembly.

6. The weld head of claim 5, wherein:
    the brake is configured to move into the disengaged position when power is supplied to the brake; and
    the brake is configured to move into the engaged position when the power is cutoff from the brake.

7. The weld head of claim 6, further comprising an actuator arm coupling the linear actuator motor to the first electrode assembly.

8. The weld head of claim 7, wherein the brake comprises:
    a spring-loaded brake configured to engage and disengage a plurality of grooves in the actuator arm; and
    a solenoid configured to drive the spring-loaded brake.

* * * * *